(12) United States Patent
Appleyard et al.

(10) Patent No.: US 10,657,361 B2
(45) Date of Patent: May 19, 2020

(54) SYSTEM TO ENFORCE PRIVACY IN IMAGES ON AN AD-HOC BASIS

(71) Applicant: International Business Machines Corporation, Armonk, NY (US)

(72) Inventors: Thomas David Francis Appleyard, Hampshire (GB); Elizabeth E. Bowen, Winchester (GB); James M. j. Silvester, Coventry (GB)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 15/409,342

(22) Filed: Jan. 18, 2017

(65) Prior Publication Data
US 2018/0205550 A1 Jul. 19, 2018

(51) Int. Cl.
*H04L 29/06* (2006.01)
*G06K 9/00* (2006.01)
*H04L 9/32* (2006.01)
*G09C 5/00* (2006.01)

(52) U.S. Cl.
CPC ..... *G06K 9/00255* (2013.01); *G06K 9/00275* (2013.01); *G06K 9/00288* (2013.01); *G09C 5/00* (2013.01); *H04L 9/3231* (2013.01)

(58) Field of Classification Search
CPC ................................ G06F 21/32; H04L 9/3231
See application file for complete search history.

(56) References Cited

U.S. PATENT DOCUMENTS

| | | | |
|---|---|---|---|
| 7,508,419 B2 | 3/2009 | Toyama et al. | |
| 8,610,787 B2 | 12/2013 | Namba et al. | |
| 9,298,931 B2 | 3/2016 | Ur et al. | |
| 9,350,914 B1 | 5/2016 | Kaur et al. | |
| 2003/0097564 A1* | 5/2003 | Tewari | H04L 12/14 713/171 |
| 2009/0012944 A1 | 1/2009 | Rodriguez et al. | |
| 2009/0319570 A1* | 12/2009 | Subramanian | G06F 17/30244 |
| 2012/0139693 A1* | 6/2012 | Zucker | G06F 21/10 340/5.2 |
| 2013/0305383 A1 | 11/2013 | Garralda et al. | |
| 2015/0242638 A1 | 8/2015 | Bitran et al. | |
| 2015/0296170 A1* | 10/2015 | Farrell | H04N 5/913 386/254 |
| 2015/0347603 A1* | 12/2015 | Jhunjhnuwala | G06F 17/30867 707/734 |

OTHER PUBLICATIONS

HP Focuses on Paparazzi-Proof Cameras, <http://www.cnet.com/news/hp-focuses-on-paparazzi-proof-cameras/>, pp. 1-2.

* cited by examiner

*Primary Examiner* — Jason K Gee
(74) *Attorney, Agent, or Firm* — Patterson + Sheridan, LLP

(57) ABSTRACT

The present disclosure relates to techniques for enforcing privacy rights in digital images. An example method generally includes receiving a image-hash as part of a wireless communications protocol where the image-hash comprises a collection of data representing an individual face. Analyzing a digital image using the image-hash to identify a matching face where the collection of data from the image-hash is used to initialize an identification algorithm. The identification algorithm is configured to return a positive identification when the individual face is present in the digital image, and editing the digital image to obscure the individual face when a positive identification is returned.

20 Claims, 5 Drawing Sheets

SYSTEM TO ENFORCE PRIVACY IN IMAGES ON AN AD-HOC BASIS

BACKGROUND

This disclosure relates to techniques for protecting the privacy of individuals, and more specifically, to enforcing privacy in digital images using a localized peer-to-peer system.

Digital cameras are becoming increasing common in society as a way for documenting and sharing daily life. Digital cameras are commonly included as a feature in multi-functional devices such as cellular telephones and table computers. The proliferation of cellular telephones connected to the internet allows individuals to create and distribute digital images on the internet using social media. The ubiquity of the internet connected camera phones creates a problem for people concerned about protecting their privacy. In particular, individuals can easily be captured in digital images taken in public places without their knowledge, making it difficult for the individual to prevent their likeness from being widely distributed on the internet.

SUMMARY

One embodiment disclosed herein provides a method for enforcing privacy rights in digital images. The method generally includes receiving a image-hash as part of a wireless communications protocol where the image-hash comprises a collection of data representing an individual face. Analyzing a digital image using the image-hash to identify a matching face where the collection of data from the image-hash is used to initialize an identification algorithm. The identification algorithm is configured to return a positive identification when the individual face is present in the digital image, and editing the digital image to obscure the individual face when a positive identification is returned.

Another embodiment includes a computer-readable storage medium storing instructions, which, when executed on a processor, performs an operation for enforcing privacy rights in digital images. The operation generally includes receiving a image-hash as part of a wireless communications protocol where the image-hash comprises a collection of data representing an individual face. Analyzing a digital image using the image-hash to identify a matching face where the collection of data from the image-hash is used to initialize an identification algorithm. The identification algorithm is configured to return a positive identification when the individual face is present in the digital image, and editing the digital image to obscure the individual face when a positive identification is returned.

Still another embodiment includes camera device with a processor and memory hosting an message processing program, which, when executed on the processor, performs an operation for enforcing privacy rights in digital images. The operation generally includes receiving a image-hash as part of a wireless communications protocol where the image-hash comprises a collection of data representing an individual face. Analyzing a digital image using the image-hash to identify a matching face where the collection of data from the image-hash is used to initialize an identification algorithm. The identification algorithm is configured to return a positive identification when the individual face is present in the digital image, and editing the digital image to obscure the individual face when a positive identification is returned.

Figure 1:
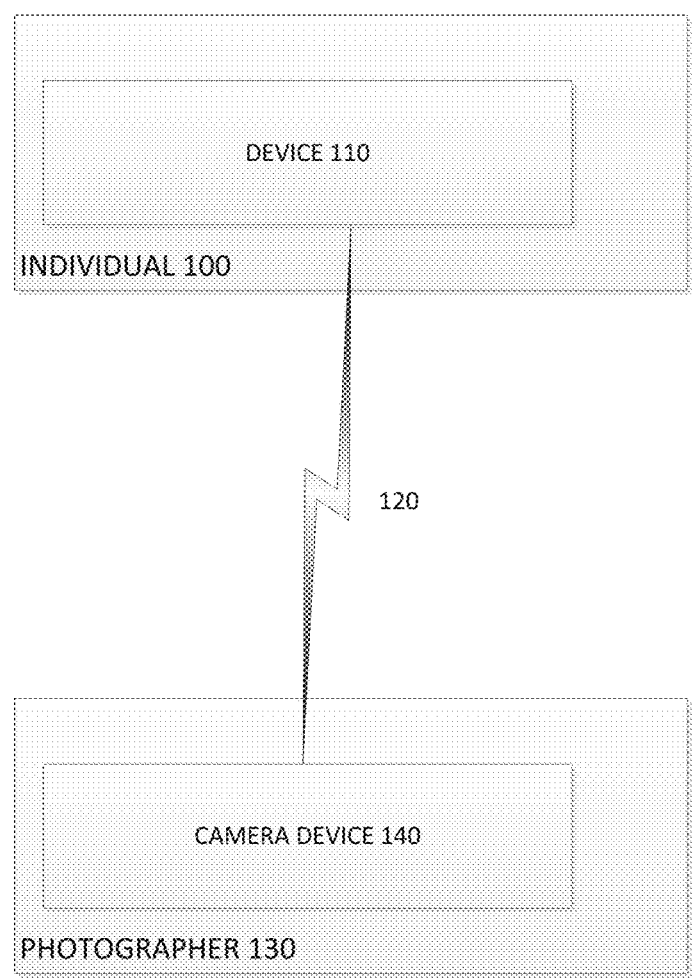
FIG. 1 illustrates an example of the privacy rights notification system according to an embodiment.

To facilitate understanding, identical reference numerals have been used, where possible, to designate identical elements that are common to the figures. It is contemplated that elements and features of one embodiment may be beneficially incorporated into other embodiments without further recitation.

DETAILED DESCRIPTION

Generally, a large percentage of the population owns a mobile phone for personal use, and often those phones include an embedded high resolution digital camera and are connected to the internet through the user's cellular telephone network provider. Phone owners typically have their phone on their person as part of daily life and use the embedded camera to document both public and private lives. With the advent of social media, users can easily upload digital images from the user's phone to social media websites, making the images available to the public. The large amount of images being generated, particularly in public spaces, creates a privacy issue for individuals present in the public space who do not want to be photographed. One method for protecting the privacy of an individual appearing in a digital image is to blur or otherwise obfuscate the face of that person, but informing the photographer which faces to blur is a challenge.

These challenges can be overcome by using a device to notify the cameras of nearby photographers of an individual's desire to be blurred from their digital images. The device notifies nearby cameras using a peer-to-peer communications system. The device broadcasts a wireless signal to nearby camera devices that allows the camera device to automatically identify and blur the individual's face from digital images on the device. The signal from the individual's device contains an image-hash of the individual's face that allows the camera device to identify the individual's face in depicted in images taken by the camera device and to apply a blurring effect. The camera device maintains a cache of image-hashes received from individuals in the immediate proximity and attempts to match any faces in digital images taken by the camera. In some embodiments, the image-hash includes a validity period or expiration date that the camera device uses to purge image-hashes from the cache. The immediate proximity generally includes the transmission range for localized wireless communications using a mobile device such as a cellular telephone, such as WiFi and Bluetooth transmissions.

The image-hash is collection of data that can be used identify the individual's face. For example, in an embodiment the image-hash is a collection of configuration data for a neural network facial recognition algorithm. The individual creates the image-hash by running a facial recognition algorithm analyzing images of the individual's face on the device. The images of the individual are a training set that establishes the bias and weight of each of the neural network nodes. Once the neural network is sufficiently trained, the final bias and weigh settings for the nodes in the network are transmitted as the image-hash. In an alternative embodiment, the facial recognition algorithm generates an extracted feature map that identifies the face of the individual. The configuration settings—node weighs and bias or extracted feature map—allow the camera device to identify the individual's face without needing to transmit an actual image of the individual. Enabling the camera device to identify the individual's face without needing to receive an image of the individual is advantageous because transmitting the configuration settings to an algorithm is much faster and less data intensive than sending an image and it is more secure because it does not share an image of the individual. The device, therefore, allows cameras in the local area to identify the individual's face and enforce their privacy rights by obscuring the individual's face in images created by the camera.

FIG. 1 illustrates an example of the privacy rights notification system according to an embodiment. As shown, individual 100 possesses a device 110 that transmits signal 120 to notify devices in the local area of the individual's desire to enforce his privacy rights in digital images. Photographer 130 possesses camera device 140 that is configured to detect and receive signal 120 to automatically enforce privacy rights in digital images taken by camera device 140. Device 110 is configured to broadcast signal 120 locally using a short range peer-to-peer protocol, such as Bluetooth®, iBeacon®, or WiFi®.

Figure 2:
FIG. 2 is a block diagram illustrating an example of a device configured to enforce privacy rights, according to one embodiment.

FIG. 2 is a block diagram illustrating an example of a device configured to enforce privacy rights, according to one embodiment. Device 110 is configured to include a broadcast agent 200, a image-hash agent 210, a image cache 220, and a network image agent 230. Broadcast agent 200 creates signal 120 and transmits the signal to the local area to notify nearby camera devices to enforce privacy rights in images they generate. In an embodiment, device 110 is a cellular telephone configured with a wireless transceiver capable of transmitting signal 120 to the local area.

Signal 120 includes an image-hash that broadcast agent 200 receives from the image-hash agent 210. The image-hash is a collection of data that identifies the face of individual 100 in a reproducible manner without providing an image of the face. In an embodiment, the image-hash includes the weights and biases for a neural network that would allow the camera device 140 to initiate a neural network to identify the face of individual 100. In a further embodiment, the image-hash is an extracted feature map of the individual's face, i.e., measurements of skin tone and measurements between facial features, such as distance between eyes, nose, lips, ears, etc. The image-hash does not need to be crypto-graphically secure.

Image-hash agent 210 generates the image-hash for use by the broadcast agent 200. Image-hash agent 210 uses one or more sample images to generate the image-hash using an identification algorithm selected by the image-hash agent. Image cache 220 stores digital images on device 110. In an embodiment, device 100 includes a digital camera configured to generate digital images and store them in image cache 220. For instance, if the image-hash agent 210 selects a neural network as the identification algorithm, then the image-hash agent 210 prompts individual 100 to select a number of photos within the image cache 220 to train the neural network. After the neural network training has been completed, image-hash agent is configured to validate the neural network training by prompting the individual 100 to select additional photos—either with or without the individual's 100 face—and prompting to individual 100 to indicate whether those photos were properly characterized by the neural network. If the individual 100 is unsatisfied with the neural network classifications, i.e., classifications were not accurate enough, then the individual 100 can select additional training images and repeat the process. Once the individual is satisfied with the neural network training, the network weights and biases recorded as the image-hash.

In an alternative embodiment, the image-hash agent 210 selects an algorithm that identifies facial features by extracting landmark features and their relative positions from a training image of the individual's face. Examples of landmark features include the size, position, and shape of the eyes, nose, cheekbones, and jaw. Once extracted, the information about the landmark features and their relative positions can be compressed and used as the image-hash. The individual 100 can validate the image-hash by selecting one or more images for the algorithm to classify, and evaluating the classifications. Once individual 100 is satisfied with the accuracy of the algorithm image-hash agent 210 uses the extracted landmark features and relative positions as the image-hash.

In some instances, image-hash agent 210 may need more photos of the private individual than are present on device 110 for training. Network image agent 230 is configured to access images over a communications network in lieu of or to supplement the photos present on the device 110. Network image agent 230 is configured to access images from remote network repositories such as, by way of example, www.Instagram.com, www.flickr.com, www.shutterfly.com, www.facebook.com, or other web accessible photo repository.

Broadcast agent 200 is configured to generate and transmit signal 120 into the local area to notify nearby camera devices 130 to enforce privacy rights. Signal 120 can conform to one of several localized wireless communications protocols, such as, for example, Bluetooth®, Bluetooth® Low Energy and iBeacon®, or Wi-Fi CERTIFIED Passpoint™ and Hotspot 2.0™ implementing IEEE 802.11u technical standard. These protocols are advantageous because they are widely supported in a variety of devices, and in particular, cellular telephones commonly support both Bluetooth and Wi-Fi protocols. Further, iBeacon and protocols implementing IEEE 802.11u allow camera devices 140 to receive information from broadcast agent 200 without the photographer needing to sign-in or take other actions establish a connection. In this embodiment, the camera device 140 detects signal 120 and can retrieve the image-hash and other information without input from photographer 130.

In an alternative embodiment, signal 120 additionally includes a cryptographic hash function identifier and a hash value that can allow the individual 100 and photographer 130 to disable the privacy rights enforcement. In some circumstances, individual 100 may want to his image to appear in digital images taken by a friend or family member while still enforcing privacy rights in other digital images taken nearby. This type of situation can arise at parties, restaurants, at tourist attractions and other events a person might attend where a group of friends or family mixes with the general public. The privacy rights enforcement is selectively disabled using a password known by the individual 100 that is communicated to the photographer 130. The password is input into device 110 by the individual 100 and received by broadcast agent 200. Broadcast agent 200 computes a hash value of the password using the cryptographic hash function. The cryptographic hash function can be one of many publicly available functions, such as, by way of example, MD-5, members of the SHA family, or other function. Broadcast agent 200 includes the hash value and cryptographic hash function identifier in signal 120 being broadcast to the local area. Camera device 140 receives signal 120 and extracts the hash value and cryptographic hash function identifier. Camera device 130 calculates a second hash value from a password entered by the photographer 130 using the identified cryptographic hash function. If the hash value extracted from the signal 120 matches the second hash value, then the image-hash received as part of signal 120 is disabled. Thus, the password allows the individual 100 to continue transmitting signal 120 to the local area, while allowing known associates to create digital images of him without their devices blurring his face.

Figure 3:
FIG. 3 is a block diagram illustrating a camera device configured to enforce privacy rights in images, according to one embodiment.

FIG. 3 is a block diagram illustrating a camera device 140 configured to enforce privacy rights in images, according to one embodiment. As illustrated, camera device 140 includes a wireless transceiver agent 300, an image manager 310, and an image-hash list 320. Wireless transceiver agent 300 is configured to monitor wireless communications frequencies and to receive signal 120 from a nearby device 110. Wireless transceiver agent 300 extracts the image-hash and, when present, any cryptographic hash function identifier and hash value, from signal 120, and stores the image-hash, and when present, the cryptographic hash function identifier and hash value, in the image-hash list 320. Image manager 310 is configured to receive digital images as they are generated by camera device 140, and to enforce privacy rights in the digital images.

Figure 4:
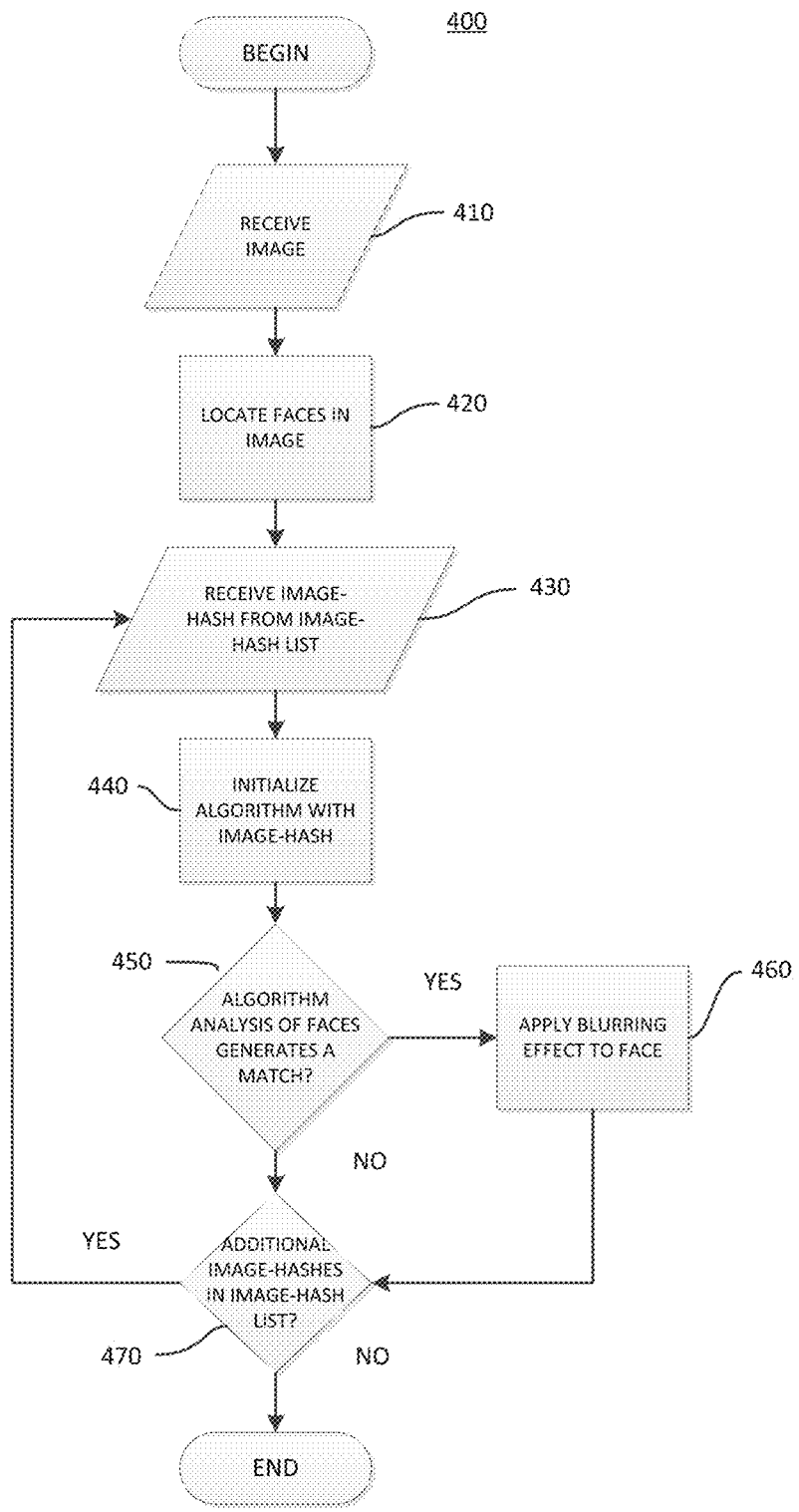
FIG. 4 is a flowchart illustrating the process for enforcing privacy rights in a digital image according to an embodiment.

FIG. 4 is a flowchart illustrating the process for enforcing privacy rights in a digital image according to an embodiment. The process 400 begins a step 410 where the image manager 310 receives a digital image from wireless transceiver agent 300. In step 420, image manager 310 locates faces in the digital image. Image manager 310 can locate faces in a digital image using one or more processing steps, including color segmentation and model based algorithms, such as, by way of example, Hausdorff distance modeling, edge-orientation matching, and classifier cascade models. An example algorithm is set forth in Robust Real-Time Face Detection by P. Viola and M. Jones, International Journal of Computer Vision 57(2), 137-154, 2004, which is hereby incorporated by reference in its entirety. In step 430, image manager 310 receives an image-hash from the image-hash list 320. In step 440, image manager 310 prepares to evaluate the located faces with the image-hash by initializing the appropriate algorithm with the configuration settings from the image-hash. For example, if the image-hash being evaluated contains the configuration settings for a neural network, the image manager 310 initializes the neural network using the node weights and biases from the image-hash and uses the face locations as inputs to the neural network.

In step 450, image manager 310 analyzes the face locations using the initialized algorithm. In cases where the algorithm analysis results in a face match, the process proceeds to step 460, where the image manager 310 applies the blurring effect or other obfuscation to the matching face location. After the blurring effect is applied, or in cases where the face did not match, the process proceeds to step 470, where the image manager 310 requests the next image-hash from the image-hash list 320. If the additional image-hashes are present in the image-hash list 320, then the process returns to step 430 and proceeds as before. If no additional image-hashes are present in the image-hash list 320, then the process ends.

Image manager 310 is configured to manage the image-hashes in image-hash list 320 to remove stale entries. In an embodiment, image manager 310 assigns each image-hash a time-to-live value when the image-hash is received from the wireless transceiver agent 300. When the time-to-live value has been exceeded, image manager 310 removes the image-hash from the image-hash list 320. Image manager 310 can enforce the time-to-live by timestamping a image-hash when it is received, and comparing the elapsed time to the time-to-live value. Alternatively, the image manager 310 can calculate an expiration date by adding the time to live to a timestamp for a received image-hash, and compare the evaluation time/date to the expiration date. In an alternative embodiment, image manager 310 can remove image-hashes from the image-hash list 320 when the device 140 has traveled far enough from the location where the image-hash was received. In this embodiment, device 140 is includes a GPS receiver configured to calculate a GPS position of device 140. When image manager 310 receives a image-hash, it receives a GPS position from the GPS receiver and assigns the GPS coordinate to the image-hash. When image manager 310 evaluates a image-hash, it receives a second GPS position from the GPS receiver, representing the location of device 140 at that time, and calculates the distance from the GPS position assigned to the image-hash to the second GPS location. If the calculated distance exceeds a threshold distance, then image manager 310 removes the image-hash from the image-hash list 320. Image manager 310 is configured to update the time-to-live value, the GPS location, or both, assigned to a image-hash when image manager 310 receives a image-hash already present in the photo-list 320.

When photographer 130 wants to disable privacy right enforcement for a known individual 100, photographer 130 inputs the password received from individual 100. Photograph manager 310 receives the password and iterates through the image-hashes in image-hash list 320, calculating a hash value of the password using the cryptographic hash function associated with the image-hash being evaluated. When the stored hash value of an image-hash matches the hash value of the received password, the photograph manager 310 marks the image-hash as "disabled."

In an alternative embodiment, the camera device 140 is configured to disable privacy right enforcement for a device 110 that is "paired" to the camera device 140. A device 110 can be paired to camera device 140 as part of wireless communications protocols, including, by way of example, Bluetooth® based communications. In this embodiment, the image-hash received from the device 110 is marked "disabled" when the pairing of the device 110 and the camera device 140 is complete.

In another alternative embodiment, camera device 140 blurs all faces depicted in digital images except those identified as matching an image-hash in the image-hash list 320. In this embodiment, the image-hash within signal 120 is used to identify face that camera device 140 will not obscure. Thus, in this embodiment the blurring effect of step 460 is applied when analysis of the faces in step 450 does not identify a match. The remaining steps of process 400 remain the same.

Figure 5:
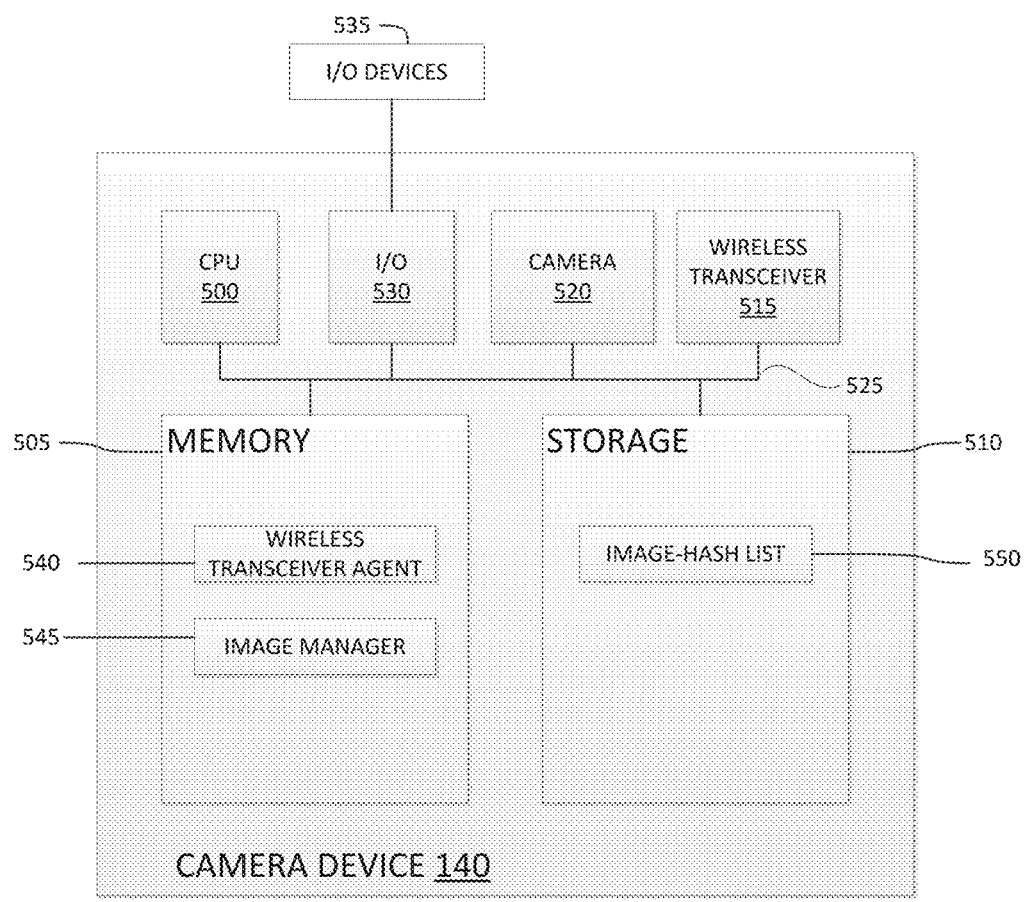
FIG. 5 illustrates a camera device configured to enforce privacy rights of nearby individuals, according to one embodiment.

FIG. 5 illustrates a camera device 140 configured to enforce privacy rights of nearby individuals, according to one embodiment. As shown, camera device 140 includes, without limitation, a central processing unit ("CPU") 500, a memory 505, storage 510, and a wireless transceiver 515, a camera 520 each connected to a bus 525. The camera device 140 may also include an I/O device interface 530 connecting I/O devices 535 (e.g., keyboard, display, mouse devices, etc.) to the camera device 140.

CPU 500 retrieves and executes programming instructions stored in memory 505 as well as stores and retrieves application data residing in the storage 510. The bus 525 is used to transmit programming instructions and application data between CPU 500, I/O device interface 530, storage 510, wireless transceiver 515, and memory 505. Note, CPU 500 is included to be representative of a single CPU, multiple CPUs, a single CPU having multiple processing cores, and the like. Memory 505 is generally included to be representative of a random access memory. Storage 510 may be a disk drive storage device or a solid state drive storage device. Although shown as a single unit, storage 510 may be a combination of fixed and/or removable storage devices, such as fixed disc drives, removable memory cards, or optical storage, network attached storage ("NAS"), or a storage area network ("SAN").

Illustratively, memory 505 includes a wireless transceiver agent 540 and a photograph manager 545, and storage 510 includes image-hash list 550. Signals received by the wireless transceiver 515 are communicated through bus 525 to wireless transceiver agent 535. Wireless transceiver agent 540 analyzes the signal and extracts a image-hash and any other associated data, such as a cryptographic hash function identifier and hash value, and communicates them to the photograph manager 545. Photograph manager 545 receives the image-hash and, when present, the associated data, and assigns the image-hash a time-to-live value before communicating the image-hash and associated data to the image-hash list 550 in storage 510. In an alternative embodiment, wireless transceiver 515 is configured to receive global positioning system signals and to communicate them to wireless transceiver agent 540, which is configured to calculate a GPS location from the signals. In such an embodiment, photograph manager 545 receives a GPS location from the wireless transceiver agent 540 and assigns the GPS location to the image-hash before communicating the image-hash to the image-hash list 550.

When a digital image is generated by camera 520 the digital image is communicated to photograph manager 545 through bus 525. Photograph manager 545 locates faces in the digital image using one or more processing steps, such as color segmentation and by applying model based algorithms. After locating faces in the digital image, photograph manager 545 retrieves a image-hash from the image-hash list 550 and initializes the evaluation algorithm from the image-hash with the included configuration settings. Photograph manager 545 applies the algorithm to the located faces in the digital image, and when the algorithm returns a match the photograph manager 545 applies a blurring effect to the face location. After the image-hash has been applied to all the face locations, photograph manager 545 retrieves the next image-hash from image-hash list 550 and repeats the evaluation until all active image-hashes have been evaluated.

Photographer 130 can input a password using I/O devices 535 that is received by I/O 530 and communicated to photograph manager 545. Photograph manager 545 evaluates the password by iteratively retrieving the associated data for image-hashes from the image-hash list 550. For each image-hash retrieved, photograph manager 545 calculates a hash value of the password using the cryptographic hash function matching the cryptographic hash function identifier from the associated data. If the calculated hash value matches the hash value from the associated data, then photograph manager 545 marks the image-hash "disabled" so that it will not be evaluated against digital images from camera 520. In an alternative embodiment, wireless transceiver agent 540 can pair camera device 140 to another device 110 using wireless transceiver 515 according to a communications protocol, such as, for example Bluetooth®. When the pairing process is complete wireless transceiver agent 540 communicates the pairing status and the image-hash for the paired device to photograph manager 545, which marks the image-hash as "disabled" in image-hash list 550.

Photograph manager 545 is configured to periodically evaluate the image-hashes stored in image-hash list 550 to remove expired image-hashes. Photograph manager 545 evaluates the time-to-live value of each image-hash, and removes any expired image-hashes from the image-hash list 550. In an alternative embodiment, photograph manager 545 is configured to remove image-hashes by evaluating the distance from camera device's 140 current GPS location, received from wireless transceiver agent 540, to the GPS locations associated with each image-hash. When the distance is greater than a threshold distance, photograph manager 545 removes the image-hash from image-hash list 550.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for selectively modifying digital images, the method comprising:
   receiving, from a first computing device in broadcast range of a second computing device, a first image-hash, wherein the first image-hash includes data characterizing a face of a first individual;
   determining a first location of the second computing device;
   registering the first image-hash as active in an image hash list, along with the first location;
   capturing, using the second computing device, a first digital image;
   identifying a first plurality of faces depicted in the first digital image;
   upon determining, based on the first image-hash, that a first face of the first plurality of faces matches the face of the first individual:
      altering the first digital image to obscure the face of the first individual depicted in the first digital image;
   upon determining, based on the image hash list, that a second face of the first plurality of faces does not match any image-hash in the image hash list:
      refraining from altering the second face in the first digital image, such that the second face is not obscured in the first digital image;
   capturing, using the second computing device, a second digital image;
   determining a updated location of the second computing device; and
   upon determining that a distance between the updated location and the first location exceeds a predefined threshold:
      registering the first image-hash as disabled in the image hash list, such that the face of the first individual will not be obscured in the second digital image.

2. The method of claim 1, wherein the first image-hash is used to configure an identification algorithm to return a positive identification when the face of the first individual is present in the first digital image.

3. The method of claim 1, wherein the first image-hash comprises a set of parameters for configuring a neural network, and wherein determining, based on the first image-hash, that the first face of the first plurality of faces matches the face of the first individual comprises:
   initiating and configuring a neural network using the set of parameters; and
   processing the first face of the first plurality of faces using the configured neural network.

4. The method of claim 1, wherein the first image-hash further comprises a first hash value and identifies a cryptographic hash function.

5. The method of claim 4, the method further comprising:
receiving a password;
calculating a second hash value of the password using the cryptographic hash function matching the cryptographic hash function identifier;
comparing the first hash value to the calculated second hash value; and
upon determining the first and second hash values match, registering the image-hash as disabled in the image hash list, such that the face of the first individual will not be obscured in captured digital images.

6. The method of claim 1 further comprising the steps of:
assigning the image-hash a time-to-live value.

7. The method of claim 1, the method further comprising:
identifying a second plurality of faces depicted in the second digital image, wherein the second plurality of faces includes the face of the first individual; and
upon determining that first image-hash is disabled, refraining from altering the second digital image, such that the face of the first individual is not obscured in the second digital image.

8. A computer-readable storage medium storing instructions, which, when executed on a processor, performs an operation for selectively modifying digital images, the operation comprising:
receiving, from a first computing device in broadcast range of a second computing device including the computer-readable storage medium, a first image-hash, wherein the first image-hash includes data characterizing a face of a first individual;
determining a first location of the second computing device;
registering the first image-hash as active in an image hash list, along with the first location;
capturing, using the second computing device, a first digital image;
identifying a first plurality of faces depicted in the first digital image;
upon determining, based on the first image-hash, that a first face of the first plurality of faces matches the face of the first individual:
altering the first digital image to obscure the face of the first individual depicted in the first digital image;
upon determining, based on the image hash list, that a second face of the first plurality of faces does not match any image-hash in the image hash list:
refraining from altering the second face in the first digital image, such that the second face is not obscured in the first digital image;
capturing, using the second computing device, a second digital image;
determining a updated location of the second computing device; and
upon determining that a distance between the updated location and the first location exceeds a predefined threshold:
registering the first image-hash as disabled in the image hash list, such that the face of the first individual will not be obscured in the second digital image.

9. The computer-readable storage medium of claim 8, wherein the first image-hash is used to configure an identification algorithm to return a positive identification when the face of the first individual is present in the first digital image.

10. The computer-readable storage medium of claim 8, wherein the first image-hash comprises a set of parameters for configuring a neural network, and wherein determining, based on the first image-hash, that the first face of the first plurality of faces matches the face of the first individual comprises:
initiating and configuring a neural network using the set of parameters; and
processing the first face of the first plurality of faces using the configured neural network.

11. The computer-readable storage medium of claim 8, wherein the first image-hash further comprises a first hash value and identifies a cryptographic hash function.

12. The computer-readable storage medium of claim 11, the operation further comprising:
receiving a password;
calculating a second hash value of the password using the cryptographic hash function matching the cryptographic hash function identifier;
comparing the first hash value to the calculated second hash value; and
upon determining the first and second hash values match, registering the image-hash as disabled in the image hash list, such that the face of the first individual will not be obscured in captured digital images.

13. The computer-readable storage medium of claim 8, the operation further comprising:
assigning the image-hash a time-to-live value.

14. The computer-readable storage medium of claim 8, the operation further comprising:
identifying a second plurality of faces depicted in the second digital image, wherein the second plurality of faces includes the face of the first individual; and
upon determining that first image-hash is disabled, refraining from altering the second digital image, such that the face of the first individual is not obscured in the second digital image.

15. A system, comprising:
a processor;
a camera device; and
memory hosting an digital image manager, which, when executed on the processor, performs an operation for selectively modifying digital images, the operation comprising:
receiving, from a first computing device in broadcast range of the system, a first image-hash, wherein the first image-hash includes data characterizing a face of a first individual;
determining a first location of the system;
registering the first image-hash as active in an image hash list, along with the first location;
capturing a first digital image generated by the camera device, using the digital image manager;
identifying a first plurality of faces depicted in the first digital image; and
upon determining, based on the first image-hash, that a first face of the first plurality of faces matches the face of the first individual:
altering the first digital image to obscure the face of the first individual depicted in the first digital image;
upon determining, based on the image hash list, that a second face of the first plurality of faces does not match any image-hash in the image hash list:
refraining from altering the second face in the first digital image, such that the second face is not obscured in the first digital image;

capturing, using the camera device, a second digital image;

determining a updated location of the system; and upon determining that a distance between the updated location and the first location exceeds a predefined threshold:

registering the first image-hash as disabled in the image hash list, such that the face of the first individual will not be obscured in the second digital image.

16. The system of claim 15, wherein the first image-hash is used to configure an identification algorithm to return a positive identification when the face of the first individual is present in the first digital image.

17. The system of claim 15, wherein the first image-hash comprises a set of parameters for configuring a neural network, and wherein determining, based on the first image-hash, that the first face of the first plurality of faces matches the face of the first individual comprises:

initiating and configuring a neural network using the set of parameters; and processing the first face of the first plurality of faces using the configured neural network.

18. The system of claim 15, wherein the first image-hash further comprises a first hash value and identifies a cryptographic hash function.

19. The system of claim 18, the operation further comprising:

receiving a password;

calculating a second hash value of the password using the cryptographic hash function matching the cryptographic hash function identifier;

comparing the first hash value to the calculated second hash value; and upon determining the first and second hash values match, registering the image-hash as disabled in the image hash list, such that the face of the first individual will not be obscured in captured digital images.

20. The system of claim 15, the operation further comprising:

assigning the image-hash a time-to-live value.

* * * * *